United States Patent [19]
Fabian et al.

[11] 3,725,433
[45] Apr. 3, 1973

[54] CONVERSION OF POLYHALOPHTHALOCYANINES INTO PIGMENTARY FORM

[75] Inventors: Wolfgang Fabian, Heidelberg; Joachim Franz, Ludwigshafen; Rudolf Polster, Frankenthal, all of Germany

[73] Assignee: Badische Anilin- & Soda-Fabrik Aktiengesellschaft, Ludwigshafen/Rhine, Germany

[22] Filed: May 3, 1971

[21] Appl. No.: 139,935

[52] U.S. Cl. ............................................. 260/314.5
[51] Int. Cl. ............................................ C09b 47/04
[58] Field of Search ................................... 260/314.5

[56] References Cited

FOREIGN PATENTS OR APPLICATIONS 1,088,736  10/1967  Great Britain .................... 260/314.5
1,039,489  8/1966  Great Britain .................... 260/314.5

*Primary Examiner*—Harry I. Moatz
*Attorney*—Johnston, Root, O'Keeffe, Keil, Thompson & Shurtleff

[57] ABSTRACT

The conversion of metal-free and metalliferous polyhalophthalocyanines into a pigmentary form by treatment of the crude pigment with a sulfuric acid monophenol ester or a reaction product of a phenol which is practically inert to nuclear sulfonation under the reaction conditions with chlorosulfonic acid or oleum. The treatment mixture then has water added to it and it is stirred for cleavage at 80° to 150°C and then aqueous sulfuric acid phase is separated and the pigment is isolated after the addition of an agent having an alkaline reaction so that the phenol passes into solution.

13 Claims, No Drawings

CONVERSION OF POLYHALOPHTHALOCYANINES INTO PIGMENTARY FORM

This invention relates to the conversion of metal-free and metalliferous polyhalophthalocyanines into a pigmentary form by treatment of the crude pigment with a sulfuric acid monophenol ester.

Polyhalophthalocyanines are obtained by synthesis in a form in which they are unsuitable for use as pigments. To convert these crude pigments into pigments of high tinctorial value ("finishing") the particle size and state of subdivision (which determine the color strength and brilliance of the pigment) have to be brought to an optimum. Many finishing methods are described in the literature, such as kneading and grinding methods which may or may not use additions of auxiliaries such as salts, acids, dispersing agents and solvents, or swelling with and reprecipitation from acids such as sulfuric acid, phosphoric acid, chlorosulfonic acid and trichloroacetic acid of a great variety of concentrations, or conditioning with organic solvents which may be of aliphatic or aromatic nature.

Which of these finishing methods is used will depend on the physical condition of the crude pigment. Finely particled amorphous crude pigments may be conditioned by almost any of the methods of the said types. Coarse-particled amorphous and agglomerated crude pigments and also coarsely crystalline crude pigments having primary particles larger than 0.1 micron or fine-particled crystalline crude pigments agglutinated into agglomerates and aggregates as a rule have to be having primary particles larger than 0.1 micron or fine-particled crystalline crude pigments agglutinated into agglomerates and aggregates as a rule have to be aftertreated in a plurality of steps. In order not to have to take into account these fine differences in each case, universally applicable finishing methods have been sought. Thus according to German Printed application DAS No. 1,242,179 a polychlorocopper phthalocyanine prepared by any method and independently of the particle size and state of subdivision is first ground and then aftertreated with an organic liquid as an aqueous suction filter cake. With a crude polychlorocopper phthalocyanine prepared according to Example 10 of German Pat. No. 717,164, there are thus obtained strongly colored pigments which are pure and yellowish green in shade. In the said method the removal of the organic solvent by steam distillation is however troublesome and color strength, purity and grain hardness may be impaired. Moreover it is not possible by this method to achieve yellowish green and pure tones from some crude pigments, for example those prepared according to U.S. Pat. No. 3,412,102 from tetrachlorophthalonitrile.

We have now found that crude metalliferous or metal-free polyhalophthalocyanines can be converted into a tinctorially valuable pigmentary form in a particularly advantageous manner by treating the crude pigment at a temperature of up to 100°C with a monophenol ester of sulfuric acid, adding water after this treatment, stirring the aqueous mixture at a temperature of from 80° to 150°C and isolating the pigment (preferably after separation of the aqueous sulfuric acid phase) by the addition of an agent having an alkaline reaction.

The crude metalliferous or metal-free polyhalophthalocyanines which may be converted into a high grade pigmentary form according to the new process are for example crude polychlorophthalocyanines or polychlorophthalocyanines or polychlorobromophthalocyanines which may be in metal-free from or metalliferous form, for example as copper phthalocyanines. Examples of suitable compounds are copper phthalocyanines having about 13 to 16 chlorine atoms per mole (chlorine content from about 43 to 50 percent by weight), polybromochlorocopper phthalocyanines in which the bromine and chlorine atoms may be contained in any ratio and whose total halogen content may be from 50 to 60 percent, or metal-free phthalocyanines having any content of bromine or chlorine, particularly metal-free phthalocyanines having 10 to 16 chlorine atoms per mole (chlorine content from about 40 to 50 percent by weight).

The crude pigment to be converted into the advantageous pigmentary form may have been prepared by any method, for example by halogenation of copper or metal-free phthalocyanines in a fluidized bed, in an organic liquid, chlorosulfonic acid, sulfur dichloride or melts of aluminum chloride and common salt, or from chlorinated phthalic acids and their derivatives as for example from tetrachlorophthalic anhydride, amide or dinitrile or mixtures of the same, which may also contain unsubstituted and less highly halogenated derivatives such as monohalo, dihalo and trihalo phthalic acids. Crude pigments may also be used which have been subjected to conventional grinding, with or without grinding aids. The crude pigments for the new process are advantageously used as dry powders with a particle size of from 0.01 to 100 microns.

The sulfuric acid monophenol esters are preferably those hemiesters of sulfuric acid which are obtained by conventional methods from chlorosulfonic acid (which may contain free sulfuric acid) or oleum (whose content of free sulfur trioxide may vary within wide limits and may be for example from 10 to 65 percent by weight) and phenols which under the conditions of the ester formation are substantially resistant to nuclear sulfonation. Examples of such phenols are those whose reactive ortho- and para-positions are occupied by substituents such as halogen atoms or alkyl groups, such as 2,4-dichlorophenol, 2,4,5-trichlorophenol, 2,4,6-trichlorophenol, 2-methyl-4,6-dichlorophenol or 2,4,5,6-tetrachlorophenol.

The treatment of the crude pigment with the said hemiesters is carried out at temperatures of up to 100°C. An advantageous procedure is to introduce the crude pigment as a dry powder into a melt of the reaction product of phenol and oleum or chlorosulfonic acid and to leave the mixture in the melt, advantageously while stirring and at from 20° to 100°C, preferably from 40° to 65°C, until a pigment sample upon microscopic examination exhibits almost no particles larger than 1 to 2 microns; this is the case after from 15 minutes to about 10 hours depending on the crude pigment.

The ratio by weight between crude pigment and melt may be varied within wide limits, for example from 1:3 to 1:10. A greater dilution than 1:10 does not bring any appreciable improvement and at ratios of less than 1:3 the reaction mixture is too difficult to stir and is not homogeneous. The amount of chlorosulfonic acid or oleum for the production of the melt of the phenol ester may for example be such that the free hydroxy groups of the phenols are esterified as required. This amount may however be varied within wide limits. Since the phenol sulfonic ester formed in the melt is itself a compound which readily crystallizes, it is as a rule advantageous to use a deficiency of free sulfur trioxide or of free chlorosulfonic acid of from about 10 to 50 percent of theory so as to lower the melting point of the melt to about 45° to 50°C. The same effect may be achieved by using two or more phenols. By combining the two measures it is possible to prepare mixtures of esters of phenols in the form of melts which are fluid and easily stirrable at ambient temperature.

After the crude pigment has been treated with the monophenol ester of sulfuric acid, water is added or the treated mixture is introduced into water so that the phenol is hydrolyzed with reformation of the phenol. The phenol is insoluble in the aqueous phase and coats the pigment which is present in an extremely fine state of subdivision so that it is protected from detrimental agglomerations. The amount of water is from about 1 to 10 parts by weight to 1 part by weight of the treated mixture. The multiphase mixture is then stirred for example for a few hours at 80° to 150°C.

The mixture may be worked up for example by first drawing off the supernatant aqueous sulfuric acid phase and advantageously replacing it by fresh water. The phenol is then converted by adding the stoichiometric amount of an alkaline reacting agent into a water-soluble salt and finally the pigment is suction filtered, washed with water and dried. The alkaline reacting agent may be for example sodium hydroxide, advantageously in the form of from 10 to 50 percent caustic soda solution, potassium hydroxide, potassium carbonate or potassium bicarbonate.

The process according to the invention makes possible the production of deep colored pigments by a very simple and universal method. It makes possible the conversion of any crude polyhalophthalocyanines (which may have been prepared by various methods and may be present in various particle sizes) into high grade pigments. It is particularly suitable for crude pigments which after their synthesis are coarsely crystalline and weakly colored, e.g., polychlorocopper phthalocyanine obtained for example according to U.S. Pat. No. 2,549,842 from tetrachlorophthalic anhydride, or a metal-free polyhalophthalocyanine which has been prepared from metal-free phthalocyanine by chlorination in phthalic anhydride at 200°C. These crude pigments could hitherto only be converted unsatisfactorily into strong pigments, and colorations prepared therewith moreover usually were very bluish and exhibited shades of unsatisfactory purity.

The following Examples illustrate the invention. The parts and percentages in the following Examples are parts and percentages by weight.

EXAMPLE 1

50 parts of chlorosulfonic acid are poured over 100 parts of 2,4,6-trichlorophenol and slowly heated to 70°C until a clear melt has formed and the evolution of gas has ended. 25 parts of polychlorocopper phthalocyanine (which has been prepared from tetrachlorophthalonitrile according to U.S. Pat. No. 3,412,102) is introduced into this melt at 65° to 75°C over 15 to 20 minutes. The mixture is then stirred for 90 minutes at 65° to 70°C. 100 parts of water is then added to the easily stirrable melt and stirred for 6 hours at 100° to 130°C. The aqueous sulfuric acid phase is then pumped off. The residue is stirred in 1,000 parts of water and 100 parts of 50 percent caustic soda solution at 80° to 90°C for 5 hours, suction filtered while hot and washed with hot water until it is neutral and odorless. A pigment paste moist with water is obtained which may be dried for example at 80°C or immediately further used.

As compared with comparable preparations which have been produced by the methods disclosed in German Printed application No. 1,242,170 or U.S. Pat. No. 3,370,065, the pigment thus prepared has higher color strength, better purity and a more yellowish shade.

Similarly pure and deep colored products are obtained by using as the crude pigment a hexadecachlorocopper phthalocyanine prepared according to U.S. Pat. No. 2,549,842 or according to Example 10 of German Pat. No. 717,164. The 2,4,6-trichlorophenol can be recovered by acidification of the alkaline mother liquor to the extent of about 80 to 95 percent. After suction filtration and drying and if necessary after purification by distillation, it may be used again for fresh finishing operations according to this Example.

EXAMPLE 2

100 parts of 2,4,6-triphenol and 60 parts of oleum having a content of 65 percent of free sulfur trioxide are melted at 70°C and then cooled to 50° to 55°C. 25 parts of hexadecachlorocopper phthalocyanine (prepared according to U.S. Pat. No. 3,412,102) is added over 15 to 30 minutes in the said temperature range. The mixture is kept for 1 hour to 3 hours at 50° to 70°C and stirred into 200 parts of water at 30° to 50°C, the temperature thus rising to about 90° to 100°C. The temperature is raised to 100° to 130°C with further stirring and kept in this temperature range for 5 to 7 hours. The aqueous sulfuric acid phase is then pumped away and the residue (a mixture of trichlorophenol and pigment) is worked up as in Example 1. A deep colored, pure, yellowish green, soft grain pigment is obtained having practically the same properties as the pigment obtainable according to Example 1.

175 parts of oleum having a content of 23 percent of free sulfur trioxide may be used instead of 60 parts of 65 percent oleum with similar results.

EXAMPLE 3

25 parts of crude hexadecachlorophthalocyanine (which has been prepared according to U.S. Pat. No. 3,412,102 or according to German Pat. No. 717,164 (Example 14)) is introduced into a melt of 50 parts of 2,4,6-trichlorophenol, 50 parts of 2,4,5,6-tetrachlorophenol and 60 parts of 65 percent oleum at from 30° to 35°C. The mixture is stirred at 40°C for 8 hours and poured into 200 parts of water at 40°C. The temperature rises to about 90°C. The whole is stirred for another 5 hours at 100° to 130°C and worked up as described in Example 1. A deep colored and pure green pigment is obtained which has somewhat less grain hardness than the product prepared according to Example 1.

2,4,5,6-tetrachlorophenol may be replaced by an equal weight of 2,4,5-trichlorophenol or 2-methyl-4,6-dichlorophenol with equally good results.

EXAMPLE 4

20 parts of metal-free polychlorophthalocyanine having a chlorine content of 49 to 50 percent (prepared according to Example 15 of German Pat. No. 717,164) is introduced over 15 to 30 minutes at 55° to 60°C into a melt of 100 parts of 2,4,6-trichlorophenol and 36 parts of 65 percent oleum. The whole is stirred for 90 minutes at 55° to 60°C and 200 parts of water is added to the melt. The temperature of the mixture thus rises to about 90°C. The whole is then stirred for another 5 hours at 100° to 120°C and worked up as described in Example 1. A particularly yellowish, pure and deep colored green pigment is obtained which approximates in shade to the commercial product containing bromine.

EXAMPLE 5

25 parts of polychlorobromocopper phthalocyanine containing eight chlorine and bromine atoms each in the molecule (prepared according to Example 12 of German Pat. No. 717,164) is introduced into a melt of 2,4,6-trichlorophenol and oleum which has been prepared as described in Example 2. The further procedure as described in Example 2 is then followed. A deep colored, pure and yellowish green pigment is obtained which is clearly superior in tinctorial properties to a comparable preparation made by the acid paste method.

We claim:

1. A process for the conversion of a crude metalliferous or metal-free polyhalophthalocyanine into a valuable pigmentary form which comprises treating the crude pigment at a temperature of from 20°C. to 100°C. with the monoester of sulfuric acid and a phenol substituted by halogen or alkyl in at least the ortho- and para-positions sufficient to render the monoester substantially inert to nuclear sulfonation under the treatment conditions, in a ratio by weight of the pigment to the monoester of at least 1:3, adding about 1 to 10 parts by weight of water per part of the treated mixture after this treatment, stirring the aqueous mixture at a temperature of from 80° to 150°C. and then isolating the pigment after adding an alkaline reagent selected from the class consisting of sodium hydroxide, potassium hydroxide, potassium carbonate and potassium bicarbonate.

2. A process as claimed in claim 1 wherein the aqueous sulfuric acid phase is separated prior to adding the alkaline reagent.

3. A process as claimed in claim 1 wherein the treatment of the crude pigment is carried out in a melt of the monoester reaction product of oleum or chlorosulfonic acid and at least one phenol substituted in at least the ortho- and para-positions sufficient to render the phenol substantially inert to nuclear sulfonation under the conditions of the treatment.

4. A process as claimed in claim 1 wherein a sulfuric acid monophenol ester of one or more phenols from the group consisting of 2,4-dichlorophenol, 2,4,5-trichlorophenol, 2,4,6-trichlorophenol, 2-methyl-4,6-dichlorophenol and 2,4,5,6-tetrachlorophenol is used.

5. A process as claimed in claim 1 wherein the treatment of the crude pigment is carried out in a melt of the reaction product of oleum or chlorosulfonic acid with a phenol or two or more phenols from the group consisting of 2,4-dichlorophenol, 2,4,5-trichlorophenol, 2,4,6-trichlorophenol, 2-methyl-4,6-dichlorophenol and 2,4,5,6-tetrachlorophenol.

6. A process as claimed in claim 5 wherein the treatment of the crude pigment is carried out in a melt of the reaction product which contains free sulfuric acid.

7. A process as claimed in claim 5 wherein the treatment of the crude pigment is carried out in a melt of the reaction product which contains free phenol.

8. A process as claimed in claim 1 wherein the treatment with the sulfuric acid monophenol ester is carried on until the particle size of the pigment is less than 2 microns.

9. A process as claimed in claim 1 wherein the crude pigment and sulfuric acid monophenol ester are used in a ratio by weight of from 1:3 to 1:10.

10. A process as claimed in claim 5 wherein the crude pigment and sulfuric acid monophenol ester are used in a ratio by weight of from 1:3 to 1:10.

11. A process as claimed in claim 7 wherein the crude pigment and sulfuric acid monophenol ester are used in a ratio by weight of from 1:3 to 1:10.

12. A process as claimed in claim 1 wherein the polyhalophthalocyanine used is from the group consisting of polychlorophthalocyanine having 40 to 50 percent by weight of chlorine, polychlorocopper phthalocyanine having 43 to 50 percent by weight of chlorine and polybromochlorocopper phthalocyanine having a content of 50 to 60 percent by weight of chlorine and bromine.

13. A process as claimed in claim 1 wherein hexadecachlorocopper phthalocyanine is treated.

* * * * *